M. Hallenbeck.
Harvester Cutter.
No. 83,628. Patented Nov. 3, 1868.
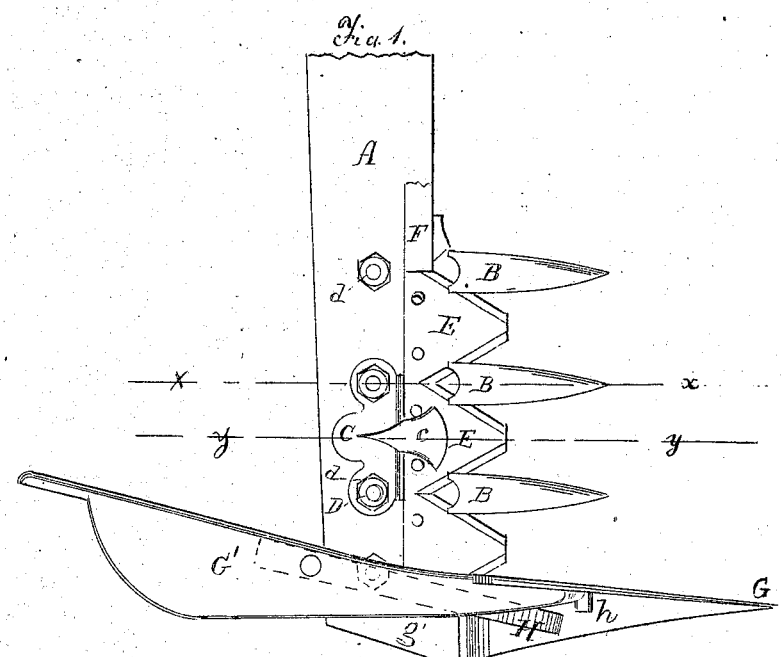
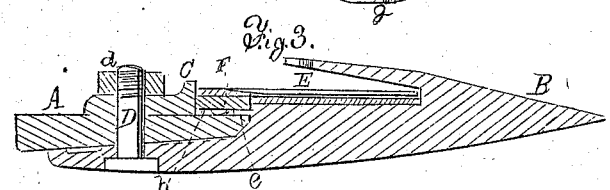
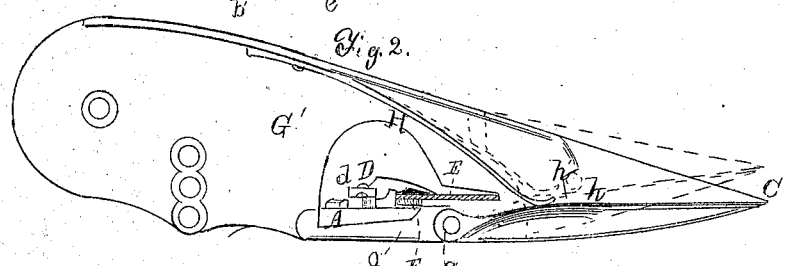
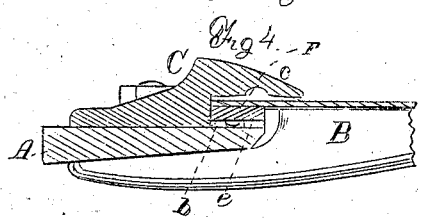
Witnesses
Geo. D. Peyton
Baltis De Long
Inventor
M. Hallenbeck
by his Atty
Wm. D. Baldwin

UNITED STATES PATENT OFFICE.

MARTIN HALLENBECK, OF ALBANY, NEW YORK, ASSIGNOR TO ALFRED BLAKER, OF NEWTOWN, PENNSYLVANIA.

IMPROVEMENT IN CUTTING APPARATUS FOR HARVESTERS.

Specification forming part of Letters Patent No. 83,628, dated November 3, 1868.

*To all whom it may concern:*

Be it known that I, MARTIN HALLENBECK, of the city and county of Albany, in the State of New York, have invented certain new and useful Improvements in Harvesters, of which the following is a full, clear, and exact description, reference being had to the accompanying drawings, which make part of this specification, and in which—

Figure 1 represents a plan or top view of so much of the cutting apparatus and divider of a harvester embracing my improvements as is necessary to illustrate the invention herein claimed, and Fig. 2 a view, in elevation, of the same as seen from the grain side. Fig. 3 represents a vertical transverse section through the cutting apparatus at the line $xx$ of Fig. 1, and Fig. 4 a similar section at the line $yy$ of Fig. 1, both these figures being on an enlarged scale.

The invention herein claimed consists, first, in a novel method of combining in a harvester a divider pivoted to play vertically on the finger-beam with a spring to limit its upward movement, whereby the divider is made closely to conform to irregularities of the surface over which it passes; second, in a novel method of combining in a harvester a divider secured to the finger-beam by a yielding connection, which allows it to play vertically, a spring to hold the divider in close contact with the ground, and a stop to limit the vibration of the divider; third, in a novel method of combining guard-fingers having projections, ledges, or studs on their shanks with brackets on the finger-beam provided with similar studs, whereby a raceway is formed, in which the cutter slides, with a space between the bottom of the cutter-bar and the top of the finger-beam, into which the heads of the rivets which secure the cutters to their bar may project, instead of rubbing against the finger-beam, as they would otherwise do.

In the accompanying drawings, A represents a finger-beam, preferably of metal, tapering from its heel to its divider end and from rear to front, as shown in the drawings.

Guard-fingers B, of the usual open slotted form, have ledges $e$ on them to overlap the front edge of the finger-beam, by which means they are held securely against vertical strains, while the guards are braced laterally by their contiguous edges.

Bracket-plates C, provided with overhanging bearers or guides $c$ to control the cutters, are arranged upon the finger-beam at intervals, there being one bracket to each pair of guards. Each bracket has two holes, through which bolts D pass. These bolts pass through the guards, the finger-beam, and the brackets. The head of the bolt fits a countersink in the under side of the guards, and the nut $d$ is above the bracket, where it is readily accessible. These parts can thus readily be removed or replaced.

The cutters E are riveted upon the bar F, which slides endwise in the usual way.

Farmers in replacing broken blades are apt to leave the rivets projecting below the cutter-bar. As machines are usually constructed these rivets would rub against the finger-beam and produce undue friction. To obviate this difficulty, I form a small stud, $b$, on each bracket. These projections, together with those $e$ on the guards, form a raceway, on which the cutter-bar runs. This arrangement diminishes friction by presenting but few points of contact between the cutter-bar and its bearings, and also leaves a space below the bar, into which the rivet-heads may project without coming in contact with the finger-beam.

The nose G of the divider is pivoted at $g$, so as to move freely vertically in a socket or shoe, $g'$, secured to the finger-beam by a bolt and nut, or in some other well-known way. The fixed part G' of the divider is also secured to or cast in one piece with this shoe.

A spring, H, secured to the divider G', presses upon the upper side of the nose G, and tends to keep it depressed. A pin, $h$, on the nose plays in a slot, $h'$, on the front edge of the divider, and limits its range of movement.

As the divider advances over the field the spring keeps the nose close to the ground. When a stone or other obstacle is encountered, the spring yields, the nose rises and runs over the obstacle, lifting the outer end of the cutting apparatus correspondingly. As soon as the obstacle is passed the spring depresses the nose again. I am thus enabled to raise short or fallen stalks, which would otherwise be wasted.

What I claim as my invention, and desire to secure by Letters Patent, is—

1. The combination, with the cutting apparatus of a harvester, of a vertically-moving divider and a depressing-spring, for the purpose set forth.

2. The combination, substantially as set forth, of a vertically-yielding divider, a depressing-spring, and a stop to limit the vibration of the divider.

3. In a harvester cutting apparatus, the construction and arrangement, for joint operation, substantially as set forth, of the finger-beam, the guard-fingers and their ledges $e$, the brackets and their ledges $b$, with the cutter-bar and cutters, for the purposes specified.

In testimony whereof I have hereunto subscribed my name.

MARTIN HALLENBECK.

Witnesses:
HENRY BALDWIN, Jr.,
WM. B. DAYTON.